Patented June 1, 1954

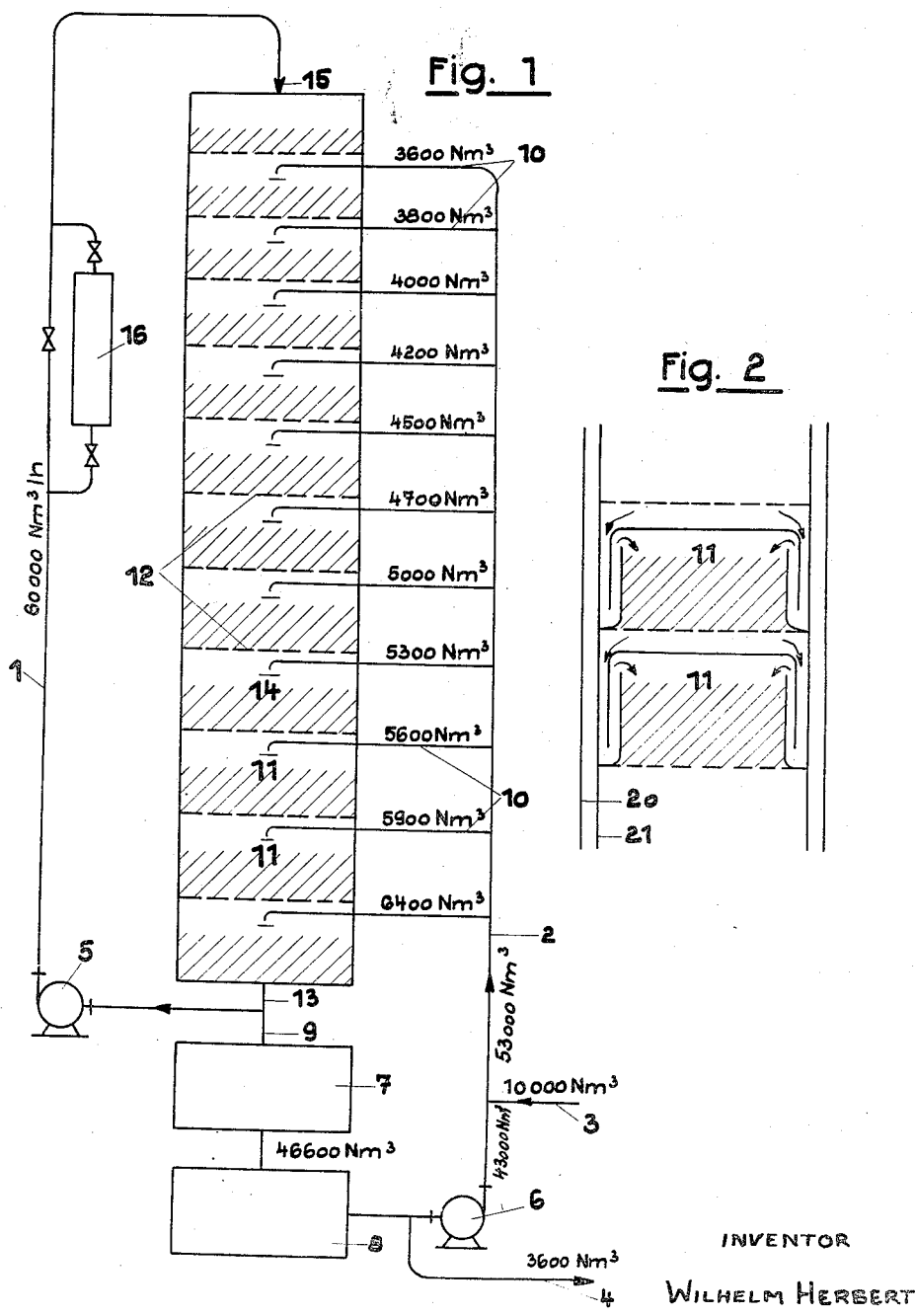

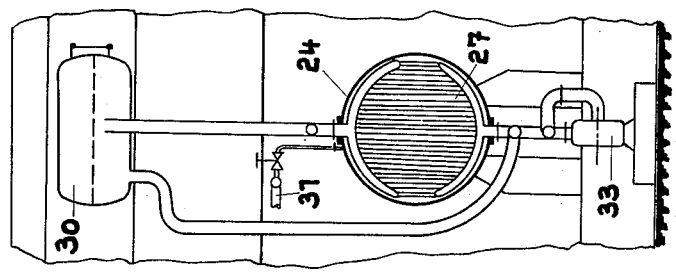
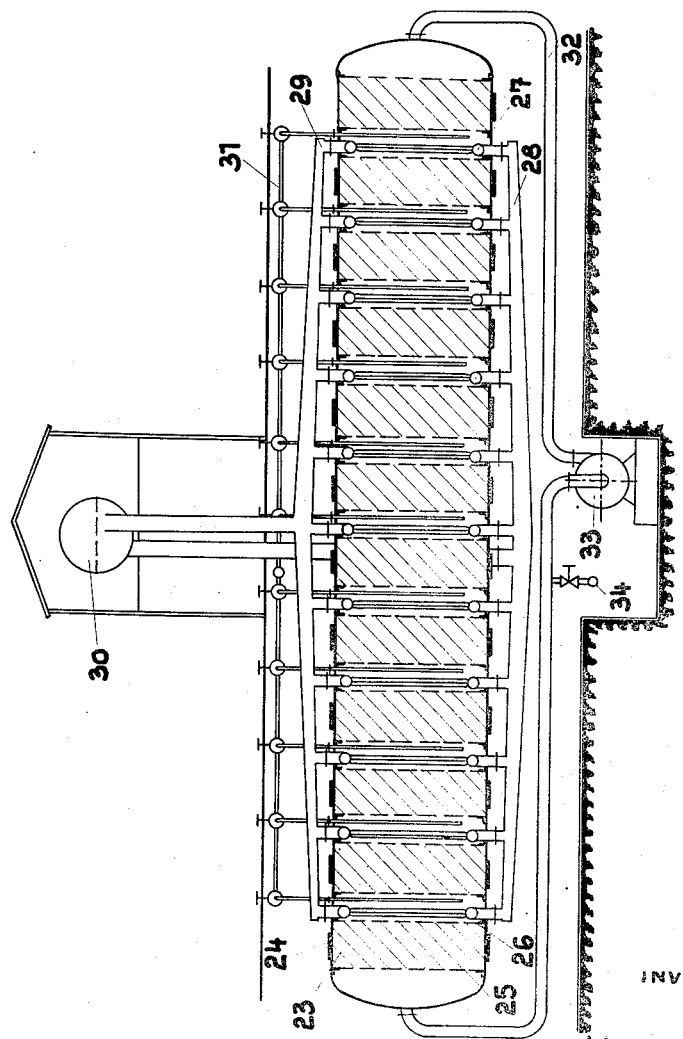

2,680,125

UNITED STATES PATENT OFFICE 2,680,125

CATALYTIC HYDROGENATION OF CARBON MONOXIDE

Wilhelm Herbert, Frankfurt am Main, Germany, assignor to Metallgesellschaft Aktiengesellschaft, Frankfurt am Main, Germany, a corporation of Germany Application September 1, 1949, Serial No. 113,562

Claims priority, application Switzerland November 2, 1948

4 Claims. (Cl. 260—449.6)

The invention relates to a process of and an apparatus for producing hydrocarbons by catalytic hydrogenation of carbon monoxide.

It is known to produce hydrocarbons by catalytic hydrogenation of carbon monoxide, for instance by the Fischer-Tropsch process, which can be carried out also in such a manner that more or less large amounts of hydrocarbon compounds, particularly alcohols, fatty acids or the like are simultaneously obtained. For this process reactors are used in which the catalyst is placed between cooling elements which are narrowly spaced and are kept at a constant temperature by water under pressure. These reactors are of a special, relatively difficult construction and cannot be made in any size desired. They have a life time of about 5–10 years only, for the boiling water under pressure has a considerable corroding effect. They have a small capacity; in continuous operation they can be charged with only about 100/N-litres (i. e. the volume of gas at 0° C., 760 mm. Hg, dry) synthesis gas per liter of catalyst per hour. As the heat of reaction must be removed transversely to the gas passage through the catalyst grains towards the cooling surface, higher quantities of gas would cause an increase of the reaction temperature, which might entail carbon deposits and clogging of the catalyst near the entrance of the gas into the catalyst. The capacity was raised by recycling the synthesis gas through the reactor. But more than twice the normal capacity could not be reached with economic result.

Higher reactor capacities are possible with other known processes using granulated or powdered catalysts kept in suspension by the flowing gas. But also in these processes the heat of reaction must be removed at a constant temperature by coolers working with boiling water under pressure.

Another known method of operation applies very large quantities of circulating gas to effect cooling. If for instance, working at about 20 atmospheres gauge and using fused iron catalysts, the gas temperature rise may be up to 30° C. Then 50–150 times the quantity of the feed gas has to be recycled. This renders the process uneconomic, so that it was not adopted in practice.

The process covered by the present invention makes it possible to operate the synthesis reactor at a very high capacity with regard to both feed gas and output of hydrocarbons formed; it simplifies the construction of the reactor considerably and renders the process particularly economic. According to this invention there are used, for hydrocarbon synthesis by catalytic hydrogenation of carbon monoxide, at least about 5 and preferably more, catalyst layers. The gas containing carbon monoxide and hydrogen is passed through one layer after the other, and the temperature of the gas is reduced by cooling between its leaving one layer and entering the following one, in order to remove the reaction heat or at least a great part thereof. Consequently, the inlet and outlet temperatures of the gas can be controlled within each individual layer of catalyst. The application of a multitude of catalyst layers eliminates the fundamental drawback of the known process i. e. the necessity to recirculate enormous quantities of gas.

The temperature control according to this invention may be effected, for instance, by leading the gas along cooling surfaces after it has left each individual layer of catalyst. Liquid condensation products, dropping from the catalyst layer or forming on the cooling surfaces, may be removed by conventional methods before the gas enters the next catalyst layer.

Preferably, only a small part of the hot reaction gas leaving the last catalyst layer is withdrawn from the reactor and worked up in known manner. The main part of the gas, if necessary after removal of any liquid products such as paraffin, is boosted by a blower or a similar device, and reintroduced into the first catalyst layer. Before this circulating gas enters the first catalyst layer, the temperature of the gas is adjusted to the starting temperature of the reaction e. g. it is reduced by about 10–15° C. on its way from the last to the first catalyst layer, for example due to normal heat losses. In the first catalyst layer the circulating gas may react again. The quantity of gas passing through the catalyst and the volume of the catalyst layers are adjusted in such a manner that within the first catalyst layer the temperature rises about 5° C. to 15° C. Before the gas enters the next catalyst layer it is cooled by coolers described, or also by addition of corresponding amounts of cold gas, e. g. cold feed gas to such an extent that the temperature is about the same the gas had when it entered the preceding catalyst layer. In the following catalyst layers the operation is analogous. According to this invention the conversion of $CO+H_2$ entering the catalyst layer is kept below 2%, preferably at 0.3–1% of the total amount of entering gas. Therefore, in the catalyst layer the change of gas composition is but small and the reaction is stopped before detrimental rises of temperature may occur.

The gas may be cooled between the layers by cooling elements which are cooled preferably by boiling water or oil. In this case hot feed gas may be added, in the first stage of synthesis, to the hot circulating gases before entering the catalyst. A further advantage may be obtained by introducing, according to this invention, cold feed gas, equally distributed, into the various catalyst layers of the reactor. By admixture of cold or warm feed gas, which is, however, not heated up to the reaction temperature, the temperature of these gases is likewise reduced between leaving one catalyst layer and entering the following. By this reduction of temperature, the reaction heat evolved may be rendered innocuous.

Furthermore, the process of this invention may be improved by introducing, instead of cold feed gas or together with the latter, cold circulating gas between the various stages. Cold gas may be obtained by branching off a portion of the gas leaving the reactor and cooling it, for instance, to 20–30° C. By this cooling, paraffins, oils and reaction water are separated so that the cold gas then introduced into the reactor is almost free from reaction products of synthesis. By this performance of the invention the partial pressure of water and reaction products within the reactor is, therefore, considerably reduced. Thus the catalytic capacity is increased and the formation of methane is lowered. Furthermore, the octane number of the products of reaction is increased as most of the additional hydrogenation of the olefines, formed by synthesis, due to recirculation is avoided. If a ratio of fresh feed gas to cold circulating gas of 1:3 up to about 1:5 (according to the reaction temperature) is applied, all of the reaction heat can be absorbed by these cold gases, and a sufficient reduction or temperature of the gases between two catalyst layers each can be reached, so that further means for cooling of the gases between the layers may be dispensed with. If the volume of circulating cold gas is sufficiently large (its upper limit is the above-mentioned ratio, or the gas would have to be heated say to 50° C. to 100° C.) the volume of hot circulating gas may be reduced, if desired. This is particularly feasible if an extremely high olefine content of the products and thus a maximum octane number is desired, or if preferably products are to be made having an especially high content of oxygen. The hot gas circulation may be dispensed with completely if a sufficient high number of catalyst layers, for instance 15–30 layers or more, are used. The number of catalyst layers, the ratio of hot gas and cold gas circulated to feed gas, and the temperature increase within one catalyst layer are in a relationship to each other. The higher the number of catalyst layers, the smaller the amount of circulating gas may be kept, and the smaller the temperature increase within each catalyst layer can be. Cheap plants and high yields of the synthesis products are thus made possible, as the investment costs are greatly influenced by the equipment for transporting and cooling the gas. Furthermore, the formation of methane is reduced and thus the yield increased if the process is carried out with a small difference of temperature within the catalyst layer. Moreover, this difference of temperature may be the greater, the higher the drop of concentration in $CO+H_2$ of the gas within the catalyst layer. The process according to this invention is, therefore, particularly advantageous in case of intensive conversion of $CO+H_2$, i. e. if about 90 to 98 per cent of the $CO+H_2$ offered in the feed gas are transformed on their passage through all catalyst layers. Thereby, the content of inert substances of the circulating gases becomes so high that the gas entering each individual catalyst layer contains but a few percent of $CO+H_2$; thus a considerable decrease of concentration within the catalyst layer results which would cause a reduction of reaction velocity within the catalyst layer. This reduction is levelled by the temperature rising within the catalyst layers in the direction of the gas flow in accordance with this invention. By the process of this invention it is, therefore, possible to adapt the temperature of the individual catalyst particle to the $CO+H_2$ concentration prevailing in its neighborhood in each particular case, and thus to obtain a uniform capacity of the catalyst within the layer, which was not possible in the reactors hitherto applied.

If, for instance, a synthesis gas of 88 per cent purity (carbon monoxide + hydrogen) is used and the transformation of carbon monoxide and hydrogen contained in the gas amounts to 93 per cent, the reaction heat corresponds to a temperature increase of the synthesis gas of 1400° C. Provided the temperature increase between the gas entering and leaving each contact layer should be, for instance, only 14° C., the known process would require for the absorption of the reaction heat an amount of circulating gas of 100 times the quantity of fresh gas used. For modern synthesis plants consuming up to about 200,000 m.³ (0° C., 760 mm. Hg, dry) of feed gas per hour, 20,000,000 m.³ of circulating gas per hour would be necessary, and this can scarcely be performed in practice, even not by application of the most modern means. According to the process of this invention only about 1,060,000 m.³ of cold gas per hour are required for removal of the reaction heat if 200,000 m.³ of synthesis gas are introduced per hour. In the various catalyst layers this cold gas is preheated, for instance from 30° C. to 280° C., by mixing it with the gas leaving a preceding layer, and the gas leaving the preceding catalyst layer is simultaneously cooled from, for instance, 295° C. to 280° C. In this example 25 catalyst layers are provided. By application of additional means, for instance indirect cooling between the layers, the amount of cold gas may even be further reduced. The number of layers may be reduced for instance to 12 by passing, as already mentioned, a hot gas cycle through all layers. The number of layers and the quantities of hot and cold gases recycled may in each particular case be easily chosen by a comparison of the cost for gas compression on the one hand and for the reactor volume on the other hand.

The process according to this invention also involves the advantage that the working conditions, for instance the load of the catalyst reactors in terms of cubic meters of $CO+H_2$ transformed per kilogram of catalyst per day, and the quantity of hot gases recycled may be varied within rather wide limits. The composition of the reaction products may thus be influenced. By working according to this invention, for instance, at high reaction temperatures and with relatively large quantities of hot gas and particularly of cold gas circulated (and maintaining constant the increase of temperature within the catalyst layers) products are obtained which are rich in olefines and have a high octane number. The catalyst remains dry so that it guarantees a high reaction velocity. The operation may be carried out under normal or elevated pressure.

for instance at 20 atmospheres and more. The synthesis may also be directed to a high production of paraffins. In the latter case the temperature is kept so low, for instance at 180° C.–250° C., that the residual gas leaving the reactor and branched off from the hot or cold gas circulating still has a $CO+H_2$ content of about 20–60 per cent, so that the complete amount of $CO+H_2$ reacted upon is below 80 per cent, preferably 50–70 per cent. In the latter case it is advantageous to connect in succession, for instance, two or more reactors so that the gas which has partly been transformed in one reactor is worked up in the following reactor or reactors.

Moreover, using the process of this invention, the circulation of gas, for instance of hot gas, may be adjusted in such a manner that, even if a synthesis gas of high percentage is used, the gas transformed at the catalyst has a high content of, for instance, 80–90 per cent of inert gases (carbon dioxide, nitrogen and methane). This involves the advantage that the gas leaving the reactor is practically completely utilized so that a single-stage synthesis is sufficient. This simplifies and cheapens the whole plant and the separation of the reaction products. Moreover, ignitions at the catalyst itself even in case of very high load can thus be avoided with certainty.

The catalysts may have the usual grain size of, for instance, 2–10 mm. In some cases, for instance, when large quantities of gas are passed through per unit of time, the grain size may even be coarser, which has for instance the advantage that the pressure drop in the catalyst layers becomes smaller. It is also possible to use a powdery catalyst material, for instance in such a manner that the catalyst is kept in suspension by the gas passing through from the bottom to the top of the reactor. Even in the case of a suspended catalyst, coarser catalyst grains of, for instance, 2–10 mm. may be used. Then, however, the gas velocity must be very high in order to keep the catalyst material in suspension, but this does not offer any difficulties with a corresponding number of stages and volumes of the gas in circulation.

The number of catalyst layers to be provided in the reactor may vary with the quantity of hot gas recycled. The use of smaller quantities of hot gas is suitably connected with an increased number of catalyst layers, but the quantity of cold gas used need not be changed for the same load with fresh synthesis gas.

The quantity of cold gas is distributed to the various catalyst layers advantageously in such a manner that within each catalyst layer the increase of the temperature of gas is the same. Thus cold gas is introduced into each catalyst layer in equal quantities. It is also possible to vary the quantities of cold gas during operation, or to pass through the catalyst layers alternatively cold gas and fresh synthesis gas or, if desired, various mixtures of feed gas and cold gas, or to introduce into the various catalyst layers different amounts of feed gas or cold gas or a mixture of both.

By varying the quantity of cold gas which reenters into the synthesis and maintaining the same quantity of feed gas added, it will, for instance, also be possible to change the ratio in which carbon monoxide and hydrogen are consumed by the reaction. When increasing the quantity of cold gas recycled, the consumption of hydrogen will become larger, and therefore the concentration of carbon monoxide in the reacting gas will increase. This results in a decrease of the formation of methane and an increase of the content of olefines and of oxygen-containing compounds of the products of reaction. If, on the other hand, the quantity of cold gas, in proportion of cold gas to feed gas, will be reduced, the opposite result will be obtained with regard to the composition of the recycled gas. The concentration of hydrogen in the reacting gas will increase, and the yield of saturated hydrocarbons will rise.

A further possibility offered by a variation of the quantity of reentered cold gas consists in controlling the composition of the end gas obtained from the synthesis in such a way that a gas specially suitable for its subsequent utilization can be obtained. For instance, the end gas will contain considerable quantities of hydrogen and carbon monoxide, when the synthesis, as already mentioned, is directed to yield high paraffin outputs. In this case, the hydrogen content of the end gas, in proportion to its carbon monoxide content, can, by an adequate adjustment of the cold gas circulation, be regulated in such a way that a gas of a nature will be obtained, which is suitable for a synthesis in one or more further reactors, in which cobalt or iron catalyst may be used.

It is possible also to vary the amounts of cold gas recycled. By passing, for instance, the gas leaving a catalyst layer along surfaces cooled by boiling water before it enters the next catalyst layer, the elimination of reaction heat by cooling and transformation of this heat into steam may be performed more or less completely by a corresponding alteration of the size of the cooling surfaces used and of the cold gas stream. The indirect cooling may even be carried out to such an extent that the cold gas stream becomes unnecessary and only hot circulating gas and fresh synthesis gas are introduced into the catalyst layers.

The catalyst may be used in various layers in succession. The layers, for instance, which the hot gas enters first may be charged with old catalyst and the following layers with a more and more young catalyst. The catalyst is, for instance, filled in boxes which may be rather easily taken from one catalyst layer and placed into another one or into or out of the reactor, preferably with application of a protective gas such as carbon dioxide, to avoid any intrusion of air. This arrangement is advantageously used even if the catalyst remains in the same layer throughout the whole of its life.

According to this invention, horizontal or inclined cylindrical containers may be advantageously used in which the individual catalyst layers are vertically or obliquely disposed between screen, slotted or perforated plates or similar walls permeable to gases. As there is some danger that the catalyst mass slides together in the course of a working period whereby gas short circuits may occur according to the invention, the individual catalyst layers may be closed at their tops by a body which is easily movable and impermeable to gases and lies with its own weight on the catalyst material. It may be useful, for instance, to apply piston-like, freely movable bodies in the filling openings for the catalyst material with which the casings for the catalyst layers are provided. When the catalyst material slides together, these piston-like bodies also sink down and thus prevent the formation of gas short circuits. The opening of the filling tube should not be filled with catalyst material as in this part of the catalyst material the gas current would be slower and the gas would remain longer than in the remaining parts of the catalyst material. This longer time of stay of the gas in the tube might be the cause of ignitions which might spread all over the catalyst material and render synthesis impossible.

Laminated or pipe coolers may be placed between the individual, vertically or obliquely arranged catalyst layers for cooling the gas before it enters the following layer. In these coolers the cooling agent is preferably boiling water or boiling oil. If cold gas is added between the layers, it is advantageously mixed carefully with the remaining gas to avoid local differences of concentration in the mixture which would cause superheating of the catalyst material.

If high-boiling hydrocarbons such as paraffin or the like are obtained by the synthesis which condense at the reaction temperature and drop downwards from the catalyst layers, the horizontal reactor offers, as compared with the vertical reactor, the advantage of an extremely simple removal of the paraffin. It is merely necessary to connect the deepest place of the reactor or of the individual catalyst sections with a pipe for eliminating the condensation product. Other measures are not necessary. It is in particular impossible that, as it occurs in vertical reactors, paraffin or similar liquid products obtained by synthesis drop from one layer into the following layer as the layers in the horizontal reactor are arranged vertically. This guarantees also a uniform reaction velocity in all layers.

Moreover, the process according to the invention may be combined with all the additional measures which are used in known processes of catalytic hydrogenation of carbon monoxide. Iron, cobalt or nickel catalysts manufactured in known manner may, for instance, be used. In the process of this invention the reaction heat of the synthesis may be contained to a great extent in the gases leaving the reactor. Contrary to the older reactors of the Fischer-Tropsch synthesis, this fact allows to utilize this heat for other operations, for instance, for separating rich washing oils as they are obtained during the production of gasoline from the residual gas of the synthesis.

Three different reactors according to this invention are illustrated in the accompanying drawings. They are given by way of examples only without limiting the invention to the special embodiments shown in the drawings.

Fig. 1 is a vertical section of a vertical reactor.

Fig. 2 shows the arrangement of cooling surfaces in another vertical reactor. A horizontal reactor is illustrated in Fig. 3 in a vertical section, and in Fig. 4 in a side-view.

According to the embodiment of the invention shown in Fig. 1, two gas cycles are applied, namely one hot gas stream 1 and one cold gas stream 2. At 3, feed gas is introduced into the plant. The residual gas leaves the plant through the piping 4. 5 is the blower for hot gas; 6 is that for cold gas. The steam generator 7 and the condensation plant 8 serve for cooling the gas arriving through the piping 9 and for separating reaction products from the gas. From the cold gas stream 2, partial streams branch off through the pipings 10 into the various sections 11 of the reactor which are formed by perforated bottoms 12 carrying the catalyst layers. In the sections there are devices 14 for thoroughly mixing the gas flowing through the reactor with the partial streams of the cold gas. At 13, the synthesis gas charged with reaction products leaves the reactor. At 15 hot gas is introduced. 16 is a furnace which serves for heating the gas when the operation of the plant is started. The division of the gas leaving the reactor into hot gas, cold gas and residual gas, the supply of fresh synthesis gas and the temperature adjustment of cold gas and hot gas are done in such a manner that in each section the mixture of cold gas and gases leaving the preceding section through the perforated bottom has the prescribed temperature which is either the same in all sections or may increase from layer to layer uniformly or in accordance with certain rules, the latter for instance if catalysts of different age are used for the process. The increase of temperature in each catalyst layer may be kept small. Generally the temperature differences between the gas entering and leaving the individual catalyst layers are controlled to 10° C. to 30° C.

The process of the invention allows a passage of gas per unit of time which is about 5 to 15 times that which may be used in the known Fischer-Tropsch synthesis. According to the invention the gas may, if desired, be transformed practically completely in a single reactor so that a multi-stage synthesis is not necessary. Moreover, the reactor according to this invention is much cheaper and simpler than the known types, and it is no longer necessary to have it manufactured by special factories.

Fig. 2 shows a reactor provided with indirect cooling. The gas is flowing through catalyst layers 11. When it has left the catalyst, it passes along cooling surfaces 20 and 21, flowing for instance first from top to bottom and then from bottom to top. It then reaches the next layer through which it flows after it has been mixed with fresh synthesis gas and, if required, cold gas.

In the horizontal reactor according to Figs. 3 and 4 catalyst layers 23 are disposed side by side in a pressure vessel 24. The catalyst layers lie between walls 25 and 26 permeable to gases. Between the catalyst layers are cooling pipes 27 which are connected by pipes 29 with the steam collector 30. 31 are fresh gas inlets, 32 and 33 are devices for a hot gas cycle. Through piping 34 the residual gas flows off; it is further treated in known condensation plants.

In the process of the invention known catalysts may be used, containing cobalt, nickel or iron and activators and carriers or the like as e. g. applied in the Fischer-Tropsch synthesis or in other known processes of producing hydrocarbons. In the products of reaction obtained by the new process the oxygen containing hydrocarbon compounds may be present in varying amounts. The percentage of these compounds in the hydrocarbons produced varies according to the catalyst used and the conditions of reaction. If for instance cobalt catalysts are applied, the oxygen containing hydrocarbon compounds in the reaction products may amount to only a few per cent or even much less. Iron catalysts will produce essentially greater quantities of these compounds even up to 20–50 per cent, consisting mainly of alcohols, fatty acids, ketones, esters and the like.

The feed gases may have the same composition and purity as those used in other processes of carbon monoxide hydrogenation.

Example

A vertical reactor used is about 30 meters high, and has a diameter of about 3 meters. It contains 12 perforated bottoms carrying a known grain catalyst. The catalyst may be piled on the topmost perforated bottom to a height of, for instance, 1.2 meters. Following the direction of the gas stream, the said height may increase regularly or in accordance with other considerations, for instance up to 2.4 meters on the lowest bottom.

The total amount of catalyst material in the reactor is 50 m.$^3$. It is distributed to the various layers in such a manner that the uppermost layer contains about half the volume of catalyst of the lowest layer. The layers between are graduated uniformly with regard to the volume of catalyst. This reactor allows to work up 10,000 m.$^3$ (0° C., 760 mm. Hg, dry) of synthesis gas per hour and more. A plant which required hitherto 100 old-type reactors, therefore, requires only about 6–8 reactors according to this invention.

60,000 m.$^3$ per hour of the gas leaving the reactor are recycled to the gas inlet 15 by blower 5 (Fig. 1). The temperature decreases between gas outlet and gas inlet amounts to about 15° C. due to unavoidable heat losses. A quantity of 46,600 m.$^3$ circulates in the cold gas cycle; after the hot gas is branched off, the gas passes through the steam generation and the condensation to the blower, 6. Before the blower a residual gas quantity of about 3,600 m.$^3$ (normal volume) per hour is branched off which may be worked up in known manner. Behind the blower the quantity of fresh gas mentioned above is introduced. By the introduction of fresh gas the amount of gas in the cycle is increased to 53,000 m.$^3$ (normal volume). It is distributed to the lower 11 catalyst layers, and by addition of cold gas the temperature increase of the gas of about 15° C., admitted per layer of catalyst, is balanced. The cold gas may be distributed to the various layers, for instance, according to the diagram indicated in the drawing.

What I claim is:

1. In a process for the catalytic hydrogenation of carbon monoxide to produce hydrocarbons and oxygenated hydrocarbons in which a gas stream containing CO and H$_2$ at reaction temperature is passed through a series of spaced fixed catalyst layers arranged in a reaction zone and containing the same catalyst, the steps which comprise maintaining said gas out of contact with liquids other than those directly produced during the reaction while such gas passes through the catalyst layers and the spaces therebetween, recycling a substantial portion of the hot gas stream leaving the last catalyst layer to the first catalyst layer at reaction temperature, removing reaction heat and products from at least a portion of the gas leaving the last catalyst to lower its temperature below the reaction temperature, recycling a portion of the cooled gas from which reaction products have been removed into the gas stream between the catalyst layers and introducing gas containing fresh CO and H$_2$ colder than the reaction temperature between the catalyst layers, the proportion of said cooled recycled gas to the gas containing fresh CO and H$_2$ is between 3:1 and 5:1, the combined amount of said cooled recycled gas and the gas containing fresh CO and H$_2$ being sufficient to cool the gas stream before it enters each succeeding catalyst layer to approximately that temperature which the gas stream had when entering the preceding layer, the temperatures within the reaction zone being essentially only controlled by the thickness of the individual catalyst layers and the gases introduced into and passed through said reaction zone.

2. In a process in accordance with claim 1, in which the amount of CO and H$_2$ converted during passage of the gas through each catalyst layer is below 2% of the CO and H$_2$ contained in the gas stream as it enters each catalyst layer.

3. In a process in accordance with claim 1, in which the amount of CO and H$_2$ converted during passage of the gas through each catalyst layer is between 0.3 and 1% of the CO and H$_2$ contained in the gas stream as it enters each catalyst layer.

4. In a process in accordance with claim 1, in which the thickness of the individual catalyst layers is such that the temperature of the gas stream is between 5° and 30° C. higher than when it entered each individual layer.

References Cited in the file of this patent

UNITED STATES PATENTS

| Number | Name | Date |
|---|---|---|
| 2,149,515 | Fischer | Mar. 7, 1939 |
| 2,351,248 | Wirth et al. | June 13, 1944 |
| 2,411,760 | Sensel | Nov. 26, 1946 |
| 2,417,164 | Huber, Jr. | Mar. 11, 1947 |
| 2,433,255 | Atwell | Dec. 23, 1947 |
| 2,463,912 | Scharmann | Mar. 8, 1949 |
| 2,503,356 | Sensel et al. | Apr. 11, 1950 |
| 2,534,853 | Carkeek | Dec. 19, 1950 |